United States Patent [19]

Terauchi

[11] Patent Number: 5,481,100

[45] Date of Patent: Jan. 2, 1996

[54] SPIRALLY ARRANGED BAR CODE

[75] Inventor: Junichi Terauchi, Ibaragi, Japan

[73] Assignee: Riso Kagaku Corporation, Tokyo, Japan

[21] Appl. No.: 278,111

[22] Filed: Jul. 20, 1994

Related U.S. Application Data

[63] Continuation of Ser. No. 44,178, Apr. 8, 1993, abandoned.

[30] Foreign Application Priority Data

Apr. 14, 1992 [JP] Japan ................................ 4-094212
Apr. 24, 1992 [JP] Japan ................................ 4-027422 U

[51] Int. Cl.⁶ .................................................. G06K 7/10
[52] U.S. Cl. ........................ 235/462; 235/470; 235/464; 235/494
[58] Field of Search ..................... 235/375, 455, 235/385, 462, 472, 467, 470, 463, 464, 494; 33/716; 242/57; 40/299, 306, 309, 316, 334

[56] References Cited

U.S. PATENT DOCUMENTS

| | | | |
|---|---|---|---|
| 3,774,014 | 11/1973 | Berler | 235/467 |
| 3,866,056 | 2/1975 | Minniear et al. | 235/470 |
| 4,282,431 | 8/1981 | Anthony, Jr. et al. | 235/467 X |
| 4,308,455 | 12/1981 | Bhilis et al. | 235/463 |
| 4,463,251 | 7/1984 | Koutonen et al. | 235/470 |
| 4,622,457 | 11/1986 | Bradley et al. | 235/464 |
| 4,652,732 | 3/1987 | Nickl | 235/467 X |
| 4,818,850 | 4/1989 | Gombrich et al. | 235/472 X |
| 4,822,987 | 4/1989 | Goldenfield et al. | 235/462 |
| 4,847,474 | 6/1989 | Engel et al. | 235/462 X |
| 5,098,642 | 3/1992 | Gaubatz | 235/462 X |
| 5,243,128 | 9/1993 | Marcoz | 33/716 X |

FOREIGN PATENT DOCUMENTS

| | | | |
|---|---|---|---|
| 8500680 | 2/1985 | European Pat. Off. | 235/385 |
| 5261061 | 12/1975 | Japan | 235/462 |
| 56-157571 | 12/1981 | Japan . | |
| 60-158257 | 10/1985 | Japan . | |
| 1102961 | 7/1989 | Japan . | |
| 1259467 | 10/1989 | Japan | 235/462 |
| 2122386 | 5/1990 | Japan . | |
| 33068 | 1/1991 | Japan . | |
| 0465783 | 3/1992 | Japan | 235/462 |
| 4113483 | 4/1992 | Japan | 235/470 |

Primary Examiner—Donald T. Hajec
Assistant Examiner—Jeffrey R. Filipek
Attorney, Agent, or Firm—Kanesaka & Takeuchi

[57] ABSTRACT

A bar code is formed of a number of parallel bars adapted to be provided circumferentially on a tubular or rod-like work and extend spirally about the center line of the work. In an alternative form, the bar code includes a number of parallel bars each adapted to extend continuously along the entire length of the work. In another alternative form, the bar code includes a number of parallel bars adapted to be provided on the surface of a belt-like work and each adapted to extend continuously along the entire length of the work.

13 Claims, 7 Drawing Sheets

SPIRALLY ARRANGED BAR CODE

This application is a continuation of application Ser. No. 08/044,178, filed Apr. 8, 1993 now abandoned.

BACKGROUND OF THE INVENTION

1. Field of the Invention

This invention relates to a bar code for representing merchandise or other information.

2. Description of the Related Art

Conventionally, in preparing products by cutting a continuous length of tubular or rod-shape work into separate pieces of a predetermined length, it has been a common practice to provide a bar code on each product in the following method.

In one conventional method, labels or the like bearing bar codes are glued to the individual products after cutting.

In another conventional method, a number of bar codes are previously provided on the tubular or rod-shape work at regular distances, and then the tubular or rod-shape work is cut at predetermined positions in such a manner that each separate product has one of the bar codes.

In the former method, each label has to be glued exactly to the predetermined position of the respective product. When automatically reading out the bar codes on the products, it would be impossible to read the bar code if glued off the predetermined position. Attaching the labels to the correct positions of the individual products one after another would result in an increased cost of production.

According to the latter method, highly precious printing and cutting should be necessary. It should be preferable to obtain many products from a single work in an effort to reduce the cost of production, but this would lower the yield as errors accumulate.

Japanese Utility Model Laid-Open Publication No. Hei 3-3068 shows a method of providing a ring-shape bar code on a tubular or rod-shape article. However, this method also has the same problem as the foregoing methods when cutting a continuous work into product lengths. Further, if there is non-continuity at the joint of opposite ends of a bar code due to slippage when the bar code is glued or printed in a ring shape, an error in reading would occur when scanned this joint section.

SUMMARY OF THE INVENTION

It is therefore an object of this invention to provide a bar code which is free from any restriction on the cutting positions and the post-cutting detecting positions when obtaining, products by cutting a continuous tubular or rod-shape work.

According to a first aspect of the invention, there is provided a bar code provided circumferentially on a tubular or rod-shape work, wherein the bar code comprises a number of parallel bars adapted to extend spirally about the center line of the work.

According to a second aspect of the invention, the bars are printed longitudinally on a belt-like article adapted to be wound spirally around an outer circumferential surface of the tubular or rod-shape work.

According to a third aspect of the invention, there is provided a bar code according to claim 1, wherein the bars are adapted to be provided on an inner peripheral surface of the tubular work and extend spirally about the center line of the work.

According to a fourth aspect of the invention, there is provided a bar code provided circumferentially on a tubular or rod-shape work, wherein the bar code comprises a number of parallel bars each adapted to extend continuously along the entire length of the work.

According to a fifth aspect of the invention, the bars are printed on a belt-like article adapted to be wound around an outer circumferential surface of the tubular or rod-shape work in such a manner that the bars are parallel to the center line of the work.

According to a sixth aspect of the invention, there is provided a bar code provided on a surface of a belt-like work, wherein the bar code comprises a number of parallel bars each adapted to extend continuously along the entire length of the work.

With any of the first to third arrangements, even if the products are obtained by cutting off the tubular or rod-shape work at longitudinally successive positions, every product has the same bar code.

The bar code spiral about the center line of the work can be detected even if the work and a sensor are relatively moved circumferentially of the work or parallel to the center line of the work.

With any of the fourth to sixth arrangements, if the bar code having a number of parallel bars is provided continuously and longitudinally on a tubular, rod-shape or belt-like work before being cut, every product will have the same bar code, irrespective of the product length and the cutting positions. It is therefore possible to provide bar codes on individual products with ease.

Since the bar code is provided on the circumferential surface of a continuous tubular or rod-shape work continuously along the entire length thereof the bar code can be detected irrespective of the position of a sensor by moving the work and the sensor in the direction of crossing the bar code (circumferentially of the work).

DETAILED DESCRIPTION

Figure 1:
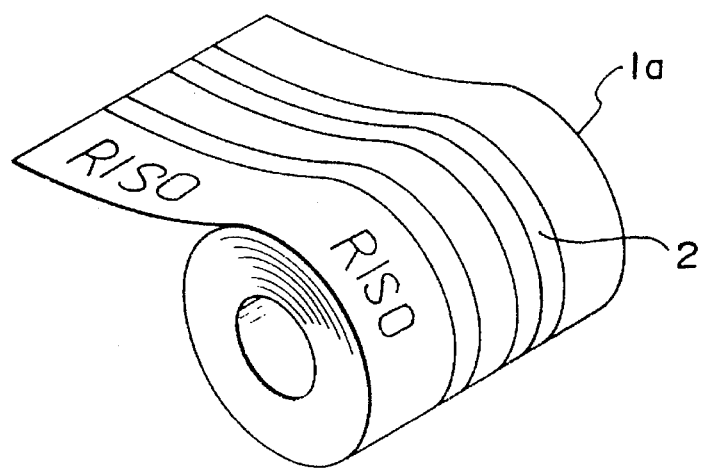
FIG. 1 is a perspective view of a belt-like article.

FIG. 1 shows a belt-like article 1a wound in a tubular shape. On the surface of the belt-like article 1a, there is continuously printed a bar code 2 composed of a number of parallel bars extending longitudinally along the entire length of the article 1a.

Figure 2:
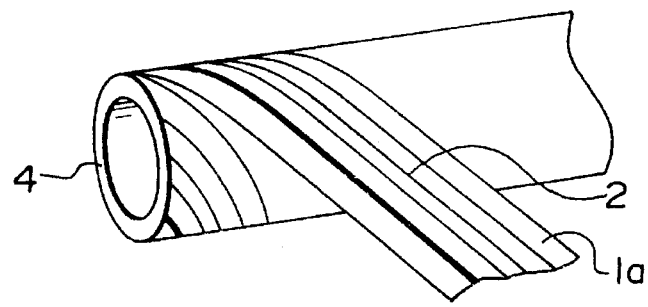
FIG. 2 is a perspective view showing a first embodiment of this invention.

FIG. 2 shows the belt-like article 1a wound on the outer circumferential surface of a tubular paper work 4 spirally about the center line of the tubular work 4.

The tubular work 4 may be used as a container, a core on which a string or the like is to be wound, or a core on which a paper or cloth sheet is to be wound. To manufacture such a roll of string or sheet, a long tubular work having the foregoing spiral bar code 2 is prepared, whereupon the string or sheet may be wound on the tubular work and then the resulting tubular work may be cut into product rolls of a predetermined length. Alternatively, the tubular work may be cut first and then the string or sheet may be wound on the individual tubular work of a product length. Since the spiral bar code 2 extends continuously along the entire length of the tubular work 4, the same bar code 2 appears on the core of every product roll even if the original tubular work is cut off at any longitudinal successive position, thus requiring no high precision for cutting position.

Figure 3:
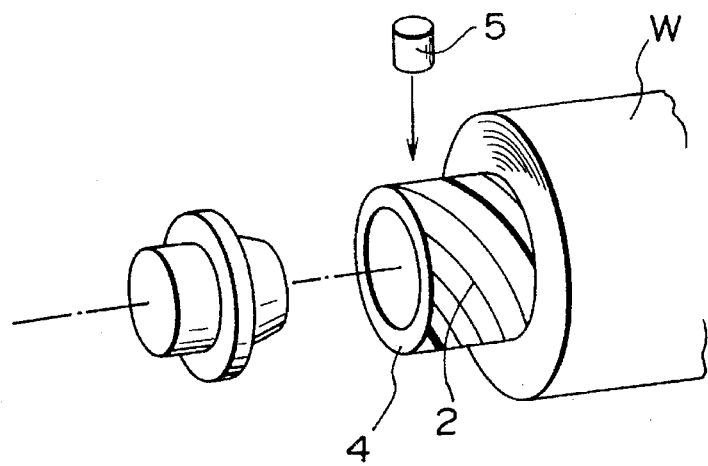
FIG. 3 is a perspective view showing a detecting method according to a second embodiment.

In any of the illustrated examples, the principles of this invention is applied to a mimeographic stencil W. In the case where a roll of mimeographic stencil W having the foregoing bar code 2 is loaded on an automatic mimeographic printer, as shown in FIG. 3, a part of the tubular core 4 should be exposed from one end of the roll of mimeographic stencil W so that the bar code 2 appearing on the outer circumferential surface of the exposed tubular core 4 is read by a sensor 5 to obtain merchandise information about the product, i.e. the mimeographic stencil W. High precision is not required for positioning the sensor 5, and it is possible to reliably read the joint-free bar code 2 by making a complete rotation of the roll of mimeographic stencil W with respect to the sensor 5.

Figure 4:
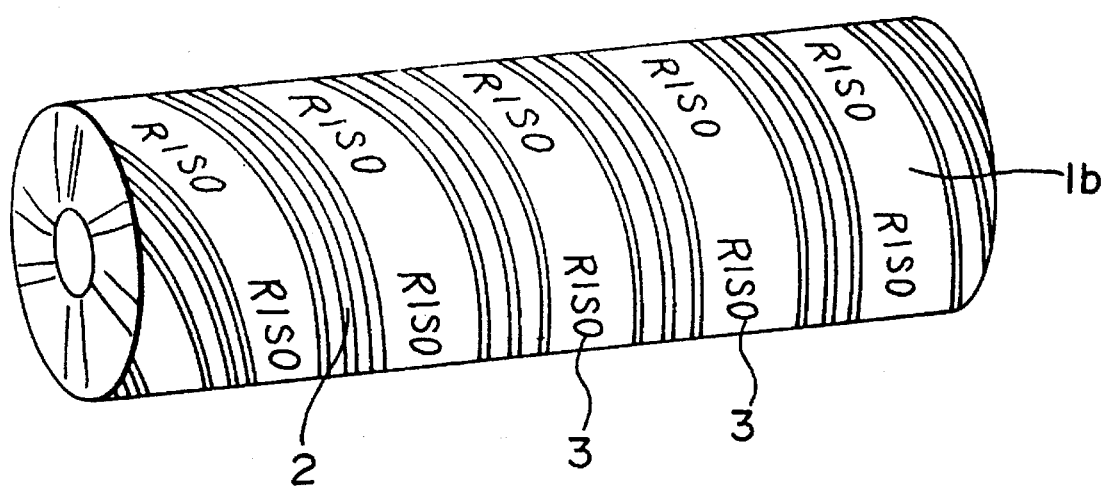
FIG. 4 is a perspective view showing a third embodiment.

FIG. 4 shows an example in which a belt-like article 1b similar to that of FIG. 1 is used as a roll of packing paper. By winding the belt-like article 1b spirally on the outer peripheral surface of the roll, it is possible to obtain a bar code 2 of the same construction as the tubular core 4 of FIG. 2. On the surface of the belt-like article 1b, the maker's name 3, for example, may be printed. If the bar code 2 can be optically read out, this maker's name should be printed in a color ink which cannot be read by an optical sensor.

Figure 5:
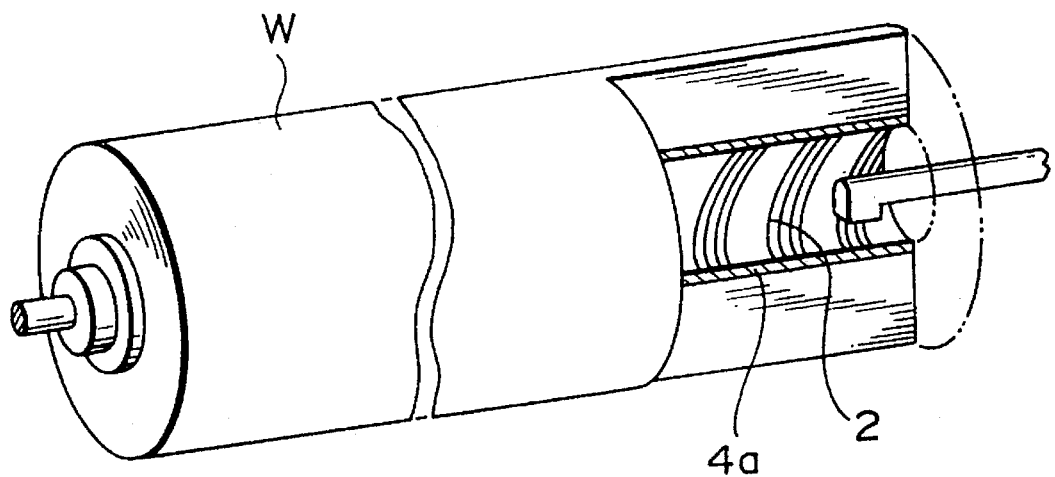
FIG. 5 is a perspective view, partially in cross section, of a fourth embodiment.
Figure 6:
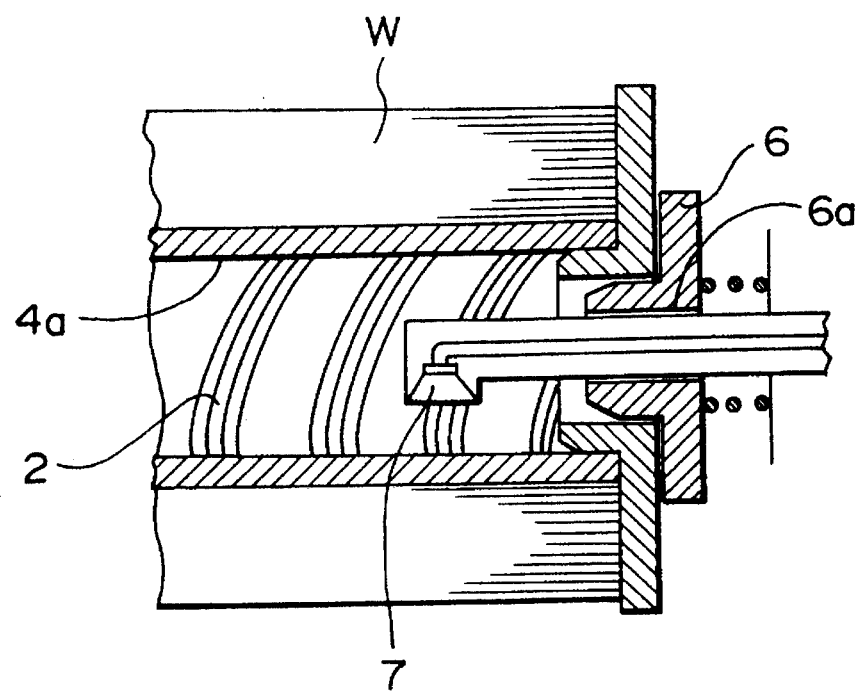
FIG. 6 is a fragmentary cross-sectional view of the fourth embodiment of FIG. 5.

FIGS. 5 and 6 show a tubular core 4a of a roll of mimeographic stencil W. The belt-like article 1a is attached spirally on the inner circumferential surface of this tubular core 4a. Thus the bar code 2 appears inside the tubular core 4a.

In the case where a roll of mimeographic stencil W having the tubular core 4a is loaded on an automatic mimeographic printer, the tubular core 4a and thus the mimeographic stencil roll W is rotatably supported by a non-illustrated frame via a holder 6. As it is inserted into an axial hole 6a of the holder 6, a sensor 7 detects the bar code 2 on the inner circumferential surface of the tubular core 4a. In this case, like the case of FIG. 3, since the bar code 2 appears likewise at any position on the inner circumferential surface of the tubular core 4a, the sensor 7 can read the bar code 2 reliably while the tubular core 4a makes a single rotation, thus requiring no high precision for positioning the sensor 7.

Figure 7:
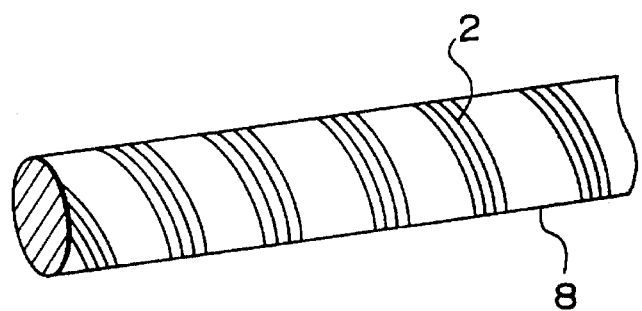
FIG. 7 is a perspective view showing a fifth embodiment.

FIG. 7 shows a substantially endless bar code 2 is wound spirally on the outer circumferential surface of a cylindrical work 8.

As is apparent from the foregoing embodiments, according to this invention, the spiral bar code extends continuously on the inner or outer circumferential surface of the tubular work or the outer circumferential surface of the cylindrical work.

With this arrangement, at whichever longitudinal positions the work is cut into product lengths, every product will have the same bar code. Further, since the bar code for the individual product appears on the entire circumferential surface of the product, high precision is not required for positioning a sensor.

Figure 8:
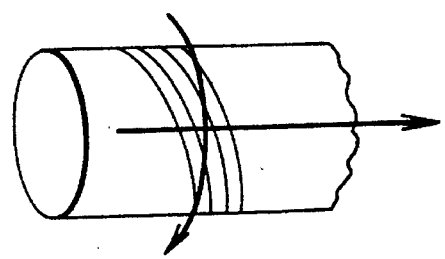
FIG. 8 illustrates the direction of detecting a bar code according to this invention.
Figure 9:
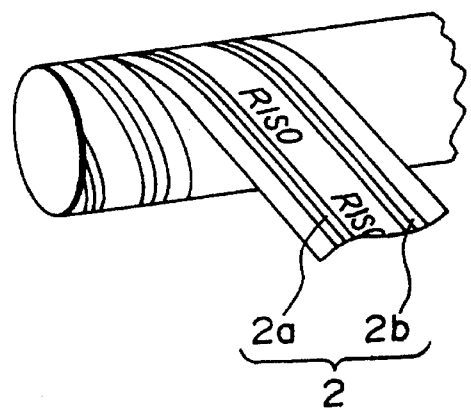
FIG. 9 is a perspective view showing a sixth embodiment.

If the bar code extends more than one revolution about the center line of the product, the direction of relative movement of the sensor may be either axial or circumferential, as shown in FIG. 8.

Further, a continuous bar code 2 to be provided on the circumferential surface of a work may include either a number of bar codes of different kinds ($2a \neq 2b$) or a number of bar codes of the same kind ($2a=2b$).

Figure 10:
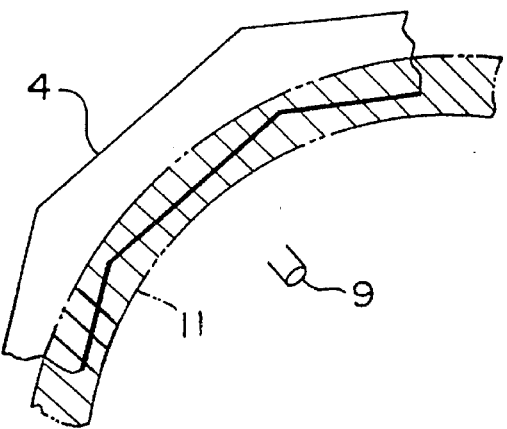
FIG. 10 shows a seventh embodiment.

In the foregoing illustrated embodiments, the bar code is composed of bars which can be optically read out. However, this invention may be applied also to bar codes which can be read otherwise, i.e., magnetically, electrostatically or mechanically. Further, in the foregoing embodiments both the tubular work 4 and the cylindrical work 8 are circular in cross section as taken along a plane perpendicular to the center line of the work. Alternatively, as long as it is not beyond the detectable range 11 of a sensor 9, the cross-sectional shape of the work may be polygonal or of any other shape, as shown in FIG. 10, and the work has the same operation and result as the illustrated embodiments.

According to the bar code of this invention, when preparing a number of products by cutting a tubular, rod-shape or belt-like work, it is possible to realize a great degree of freedom for the cutting positions and/or the detecting position.

Figure 11:
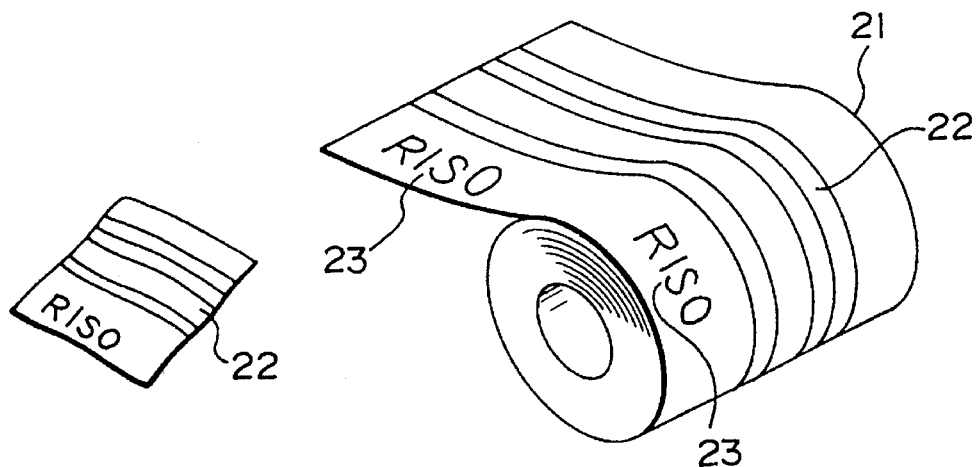
FIG. 11 is a perspective view showing an eighth embodiment.

FIG. 11 shows a continuous length of belt-like article 21 wound in a tubular shape. On the surface of the continuous belt-like article 21, there is continuously printed a bar code 22 composed of a number of parallel bars extending longitudinally along the entire length of the continuous belt-like article 21. Since the bar code 22 extends along the entire length of the continuous belt-like article 21, the same bar code 22 appears on every individual product length of belt-like article 21, irrespective of the cutting positions.

Figure 12:
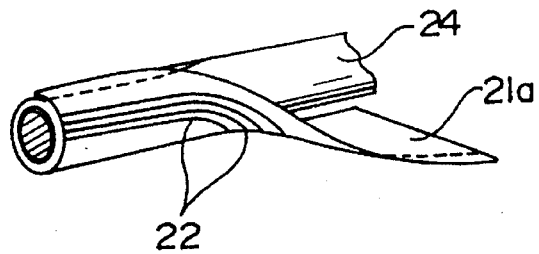
FIG. 12 is a perspective view showing a ninth embodiment.

FIG. 12 shows a belt-like article 21a having the same bar code 22 as that of the belt-like article 21 of FIG. 11 and attached on the outer circumferential surface of a paper tubular work 24. Alternatively, the bar code 22 may be printed directly on the circumferential surface of the tubular work 24.

Figure 16:
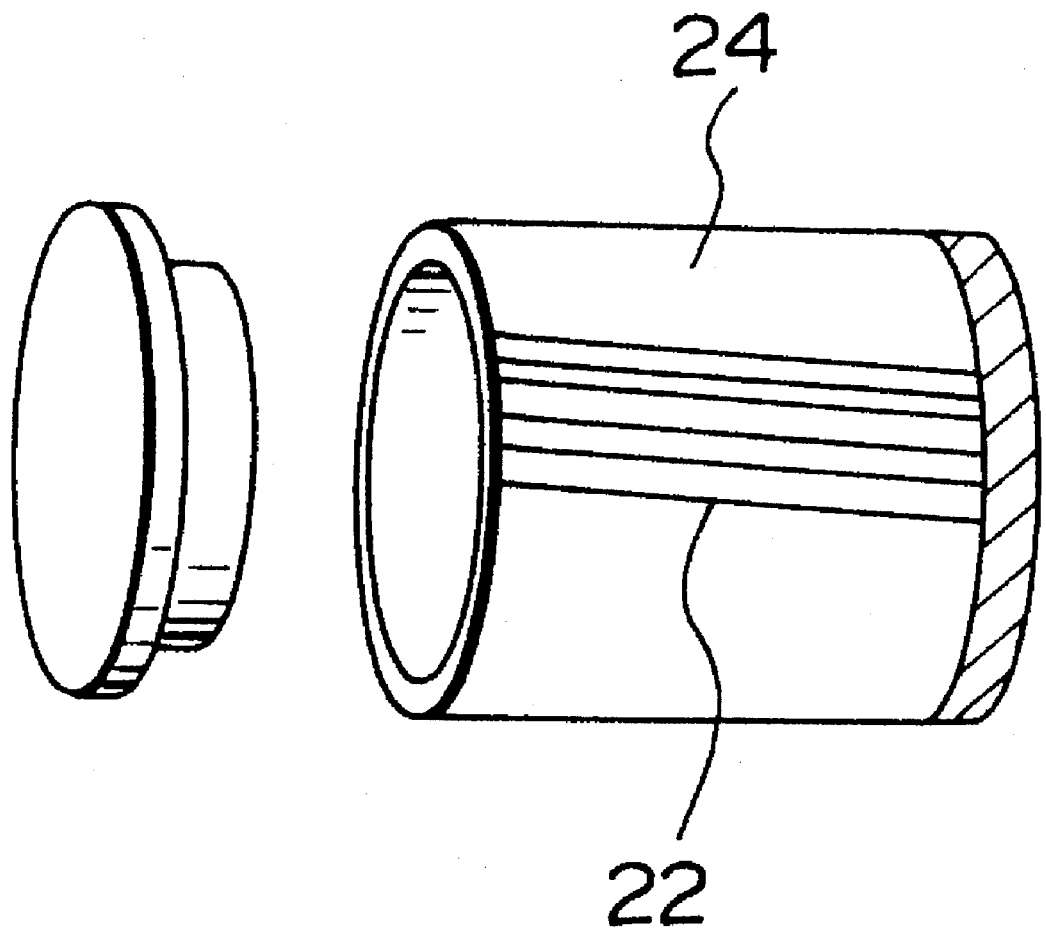
FIG. 16 is a perspective view showing a twelfth embodiment.

The tubular work 24 may be used as a tubular container such as shown in FIG. 16, a core on which a string is to be wound, or a core on which a paper or cloth sheet is to be wound. To manufacture a roll of string or sheet, a long tubular core having the above-mentioned bar code 22 should be prepared, whereupon the string or sheet is wound on the long tubular core, and then the resulting long tubular work is cut off at predetermined distances. Or the long tubular core itself is cut off at predetermined distances and then the string or sheet is wound on the tubular core.

In this embodiment, since the bar code 22 extends along the entire length of the long tubular work 24, the same bar code 22 appears on the core of every product length at whichever positions the resulting long tubular work 24 is cut off, thus requiring no high precision for the cutting positions.

Figure 13:
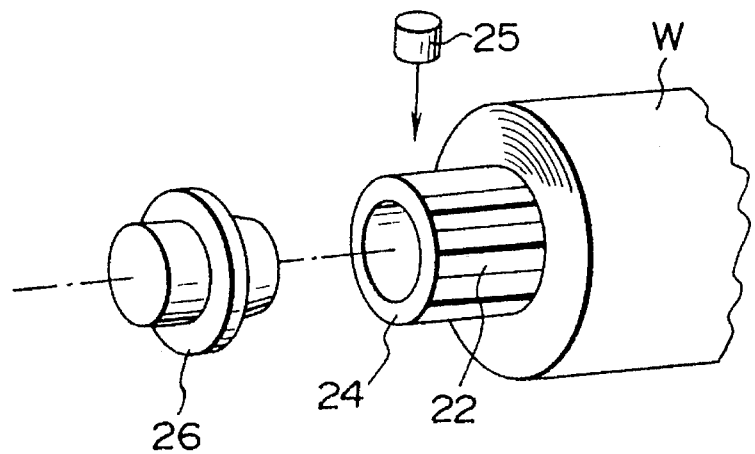
FIG. 13 is a perspective view showing a detecting method according to the ninth embodiment of FIG. 12.

In any of the illustrated examples, the principles of this invention is applied to a mimeographic stencil. In the case where a roll of mimeographic stencil W having the foregoing bar code 22 is loaded on an automatic mimeographic printer, as shown in FIG. 13, a part of the tubular core 24 should be exposed from one end of the mimeographic stencil roll W so that the bar code 22 appearing on the outer circumferential surface of the exposed tubular core 24 is read by a sensor 25 to obtain merchandise information about the product, i.e., the mimeographic stencil W. High precision is not required for positioning the sensor 25, and it is possible to reliably read the joint-free bar code 22 by making a complete rotation of the mimeographic stencil roll W with respect to the sensor 25.

FIG. 13 shows a tubular core 24 of a roll of mimeographic stencil W. The bar code 22 appears on the outer circumferential surface of the tubular core 24.

Figure 14:
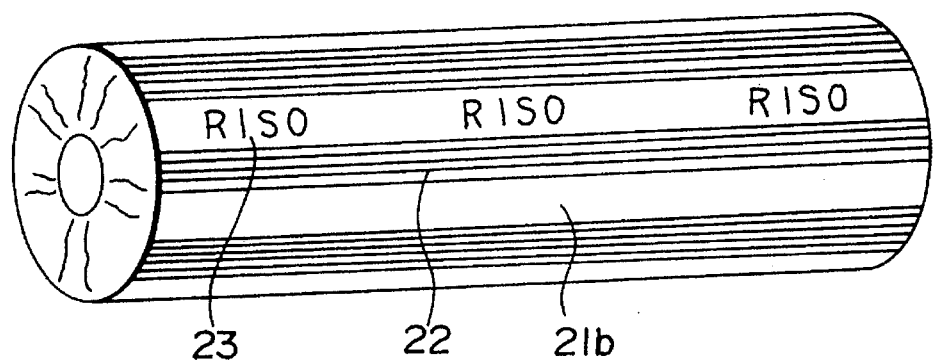
FIG. 14 is a perspective view showing a tenth embodiment.
Figure 15:
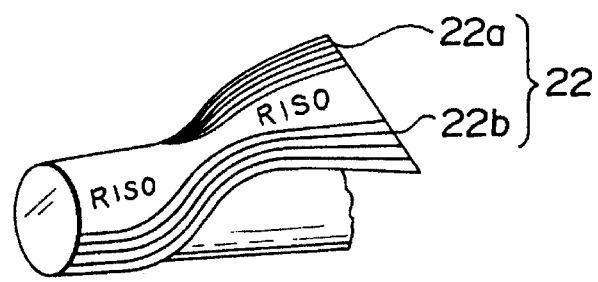
FIG. 15 is a perspective view showing an eleventh embodiment.

In the case where a roll of mimeographic stencil W having the tubular core 24 is loaded on an automatic mimeographic printer, the tubular core 24 and thus the mimeographic stencil roll W is rotatably supported by a non-illustrated frame via a holder 26. The sensor 25 detects the bar code 22 in the outer circumferential surface of the tubular core 24. Since the bar code 22 appears likewise at any position on the outer circumferential surface of the tubular core 24, the sensor 25 can read the bar code 22 reliably while the tubular core 24 makes a single rotation, thus requiring no high precision for positioning the sensor 25. FIG. 14 shows an example in which a belt-like article 21b similar to that of FIG. 1 is used as a roll of packing paper.

By winding a belt-like article 21b similar to that of FIG. 1 on the outer circumferential surface of the roll, it is possible to obtain a bar code 22 of the same construction as the tubular core 24 of FIG. 12.

On the surface of the belt-like article 21b, the maker's name 23, for example, may be printed. If the bar code 22 can be optically read out, this maker's name 23 should be printed in a color ink which cannot be read by an optical sensor.

Though there is no illustration in the drawings, if the sensor and the roll are relatively moved circumferentially of the roll, the bar code 22 can be read by the sensor, at which time high precision is not required for positioning the sensor.

As is apparent from the foregoing embodiments, according to this invention, the bar code parallel to the center line of the tubular or cylindrical work continuously extends on the inner or outer circumferential surface of the tubular work or on the outer circumferential surface of the cylindrical work. Regarding the belt-like article, the bar code extends continuously along the article.

With this arrangement, at whichever longitudinal positions the work is cut into product lengths, every product will have the same bar code. Further, since the bar code for the individual product appears on the entire circumferential surface of the product, high precision is to required for positioning a sensor.

Further, a continuous bar code 22 to be provided on the circumferential surface of a work or on the surface of a belt-like article may include either a number of bar codes of different kinds (2a≠2b) or a number of bar codes of the same kind (2a=2b).

In the foregoing illustrated embodiment, the bar code is composed of bars which can be optically read out. However, this invention may be applied also to bar codes which can be read otherwise, i.e., magnetically, electrostatically or mechanically.

Further, in the foregoing embodiments, both the tubular work and the cylindrical work are circular in cross section as taken along a plane perpendicular to the center line of the work. Alternatively, as long as it is not beyond the detectable range 11 of a sensor 9, the cross-sectional shape of the work may be polygonal or of any other shape, as shown in FIG. 10, and the work has the same operation and result as the illustrated embodiment.

According to the bar code of this invention, when preparing a number of products by cutting a tubular, rod-shape or belt-like work, it is possible to realize a great degree of freedom for the cutting positions and the detecting position.

What is claimed is:

1. A bar code device comprising, an elongated member having a circumferential surface and at least a predetermined longitudinal length, and a bar code spirally provided on the circumferential surface of the elongated member, said bar code completely surrounding an entire area of the circumferential surface of the elongated member in said predetermined longitudinal length so that when the bar code is scanned with respect to a sensor for reading the bar code in one of a longitudinal direction of the elongated member for the predetermined longitudinal length and a direction perpendicular to the longitudinal direction along the circumferential surface of the elongated member, the bar code is surely ready.

2. A bar code device according to claim 1, wherein said elongated member is cut perpendicular to the longitudinal direction at a distance more than the predetermined longitudinal length to form a product with a complete bar code on the circumferential surface.

3. A bar code device according to claim 2, wherein said circumferential surface of the elongated member is an outer surface of the elongated member.

4. A bar code device according to claim 2, wherein said elongated member has a hollow portion therein, said circumferential surface being an inner surface of the hollow portion.

5. A bar code device according to claim 1, wherein said bar code surrounds the circumferential surface of the elongated member at least twice in the predetermined longitudinal length.

6. A bar code device according to claim 1, further comprising a belt-like article having the bar code thereon, said belt-like article being spirally wound all around the elongated member without forming a space in a longitudinal direction of the elongated member.

7. A bar code device according to claim 6, wherein said belt-like article includes a character which is different from the bar code and is not read by the sensor.

8. A bar code device according to claim 6, wherein said belt-like article is wound around an outer surface of the elongated member forming the circumferential surface.

9. A bar code device according to claim 6, wherein said elongated member has a cylindrical form with an inner surface forming the circumferential surface, said belt-like article being situated at the entire inner surface of the elongated member.

10. A bar code device comprising, an elongated member having a circumferential surface and at least a predetermined longitudinal length, and a plurality of bar codes arranged parallel to each other and spirally provided on the circumferential surface of the elongated member, a complete bar code being shown on any part of the circumferential surface in and along the predetermined longitudinal length so that when the bar code is scanned with respect to a sensor for reading the bar code along a completely circumferential surface of the elongated member in the predetermined longitudinal length, the bar code is read at least twice, and when the bar code is scanned in one of a longitudinal direction of the elongated member for the predetermined longitudinal length and a direction perpendicular to the longitudinal direction along the circumferential surface of the elongated member, the bar code is surely read.

11. A bar code device according to claim 10, wherein said elongated member is cut perpendicular to the longitudinal direction at a distance more than the predetermined longitudinal length to form a product with a complete bar code on the circumferential surface.

12. A bar code device according to claim 11, wherein said circumferential surface of the elongated member is an outer surface of the elongated member.

13. A bar code device according to claim 11, wherein said elongated member has a hollow portion therein, said circumferential surface being an inner surface of the hollow portion.

* * * * *

UNITED STATES PATENT AND TRADEMARK OFFICE
CERTIFICATE OF CORRECTION

PATENT NO. : 5,481,100
DATED : January 2, 1996
INVENTOR(S) : Junichi Terauchi

It is certified that error appears in the above-indentified patent and that said Letters Patent is hereby corrected as shown below:

Column 6, claim 1, line 14, change "ready" to --read--.

Signed and Sealed this

Sixteenth Day of April, 1996

Attest:

BRUCE LEHMAN

Attesting Officer

Commissioner of Patents and Trademarks